US012067517B2

(12) United States Patent
Trafford et al.

(10) Patent No.: US 12,067,517 B2
(45) Date of Patent: *Aug. 20, 2024

(54) FACILITATING SHAREHOLDER VOTING AND ASSOCIATED PROXY RIGHTS

(71) Applicant: Block, Inc., Oakland, CA (US)

(72) Inventors: Andrew Trafford, San Francisco, CA (US); Laurence Beal, San Francisco, CA (US); Ryan Budd, San Francisco, CA (US); River Satya, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,534

(22) Filed: Feb. 13, 2023

(65) Prior Publication Data
US 2023/0222424 A1     Jul. 13, 2023

Related U.S. Application Data

(63) Continuation of application No. 17/026,039, filed on Sep. 18, 2020, now Pat. No. 11,580,478.

(51) Int. Cl.
G06Q 10/0637     (2023.01)
G07C 13/00       (2006.01)

(52) U.S. Cl.
CPC ......... *G06Q 10/0637* (2013.01); *G07C 13/00* (2013.01); *G06Q 2230/00* (2013.01)

(58) Field of Classification Search
None
See application file for complete search history.

(56) References Cited

U.S. PATENT DOCUMENTS 8,447,664 B1    5/2013  Pape et al.
11,551,175 B1   1/2023  Trafford et al.
(Continued)

FOREIGN PATENT DOCUMENTS

WO      2012075364 A1    6/2012
WO   WO-2012075364 A1 *  6/2012  ............ G06Q 40/04
WO      2014134575 A1    9/2014

OTHER PUBLICATIONS

Robin Miller "Shareholder Advocacy in Corporate Elections: Case Studies in Proxy Voting Websites for Retail Investors", Dec. 2016, International Development, Community and Environment (IDCE), pp. 1-46. (Year: 2016).*

(Continued)

*Primary Examiner* — Romain Jeanty
(74) *Attorney, Agent, or Firm* — Polsinelli PC

(57) ABSTRACT

A computer-implemented method, comprises providing, by a platform server configured to hold security assets on behalf of a plurality of user accounts, a plurality of user accounts hosted by the platform server, each of the plurality of user accounts holding shares of a common equity with associated shareholder voting rights. The platform server receives a request to send proxy voting rights, wherein the proxy voting rights indicate a desire of the first user to transfer a shareholder voting instruction to a second user. The platform server determines based on transaction history of one or more user accounts of the plurality of user accounts, one or more recommended proxy users for transferring the proxy voting rights. The platform server transmits to the application executing on the device associated with the first user, a request to select one of the recommended proxy users. Upon receiving a selected proxy user from the first user, the platform server provides the shareholder voting instruction (Continued)

to enable proxy voting by the selected proxy user on behalf of the first user.

20 Claims, 8 Drawing Sheets

(56) References Cited

U.S. PATENT DOCUMENTS

| | | |
|---|---|---|
| 11,580,478 B1 | 2/2023 | Trafford et al. |
| 2002/0186665 A1 | 12/2002 | Chaffee et al. |
| 2006/0016887 A1 | 1/2006 | Faulk |
| 2010/0287104 A1* | 11/2010 | Leroy .................. G06Q 10/101 |
| | | 709/204 |
| 2011/0035287 A1 | 2/2011 | Fox |
| 2011/0191147 A1 | 8/2011 | Cunningham |
| 2012/0215552 A1 | 8/2012 | Goldschmidt |
| 2012/0239464 A1 | 9/2012 | Vicari |
| 2012/0323938 A1 | 12/2012 | Skeen et al. |
| 2014/0067855 A1 | 3/2014 | Shartzer et al. |
| 2014/0075004 A1* | 3/2014 | Van Dusen ............ G06N 20/00 |
| | | 709/223 |
| 2014/0317098 A1 | 10/2014 | Jain et al. |
| 2014/0324521 A1 | 10/2014 | Mun |
| 2015/0254918 A1 | 9/2015 | Miller et al. |
| 2018/0033082 A1 | 2/2018 | Meng |
| 2019/0035025 A1* | 1/2019 | Little ..................... G06Q 40/06 |

OTHER PUBLICATIONS

Bhagat et al., "Cumulative Voting: The Value of Minority Shareholder Voting Rights", The Journal of Law and Economics, vol. 27, Issue 2, p. 339 (Oct. 1984).

Bainbridge, "The Scope of the SEC's Authority over Shareholder Voting Rights", UCLA School of Law, pp. 1-22 (2010).

Henry et al., "The Evolution of Shareholder Voting Rights: Separation of Ownership and Consumption", Yale Law School and ECGI, pp. 1-49 (Feb. 2013).

* cited by examiner

FACILITATING SHAREHOLDER VOTING AND ASSOCIATED PROXY RIGHTS

BACKGROUND

Investors of the general public, often referred to as retail investors, have commonly used security assets such as stocks and bonds as investment instruments. Security assets may represent equity in the issuer of the security, debt provided to the issuer, or even derivatives of other assets. One or more online platforms may be provided by security exchanges, brokers, and asset managers for investors to trade securities or facilitate other security-related activities, such as voting in stockholder meetings. Investors may access the online platforms through a browser, a mobile application, or other suitable software. The online platform may display information about securities (e.g., pricing information), provide analysis tools, receive orders from the investors, and communicate with other systems to execute exchange orders and other security-related activities.

Ownership of securities, such as common stock and preferred stock often provide shareholders with the right to vote on company issues. Shareholders are able to exercise their voting rights to vote on upcoming business decisions, often through online platforms and other proxy voting portals. Shareholders with less than one share of stock, often referred to as a fractional share, do not meet a one share minimum requirement for having voting rights. Fractional shareholders' votes are often dismissed, discounted, or otherwise excluded from being submitted to the company by the online platforms.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
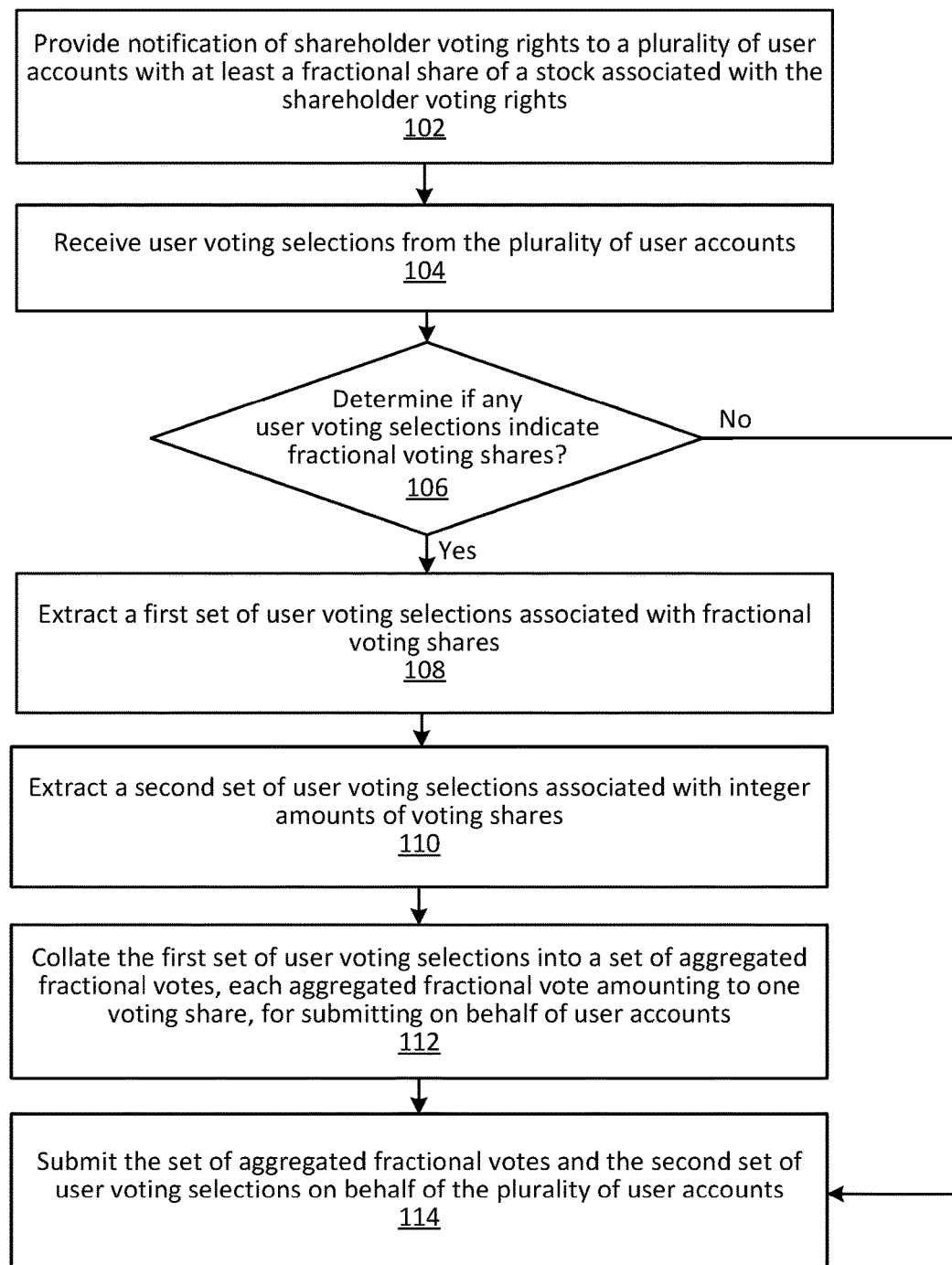
FIG. 1 illustrates a flow chart of a fractional voting procedure according to one example as described herein.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Various examples of the present technology provide for an asset management platform that provides its users with the ability to purchase, sell, transfer, or manage their financial assets and any rights associated thereto, such as stock and associated shareholder rights. The asset management platform may also provide a payment service for facilitating payments between users, merchants, and other entities, according to some examples. Some examples may provide for the payment service to be a service provided by the asset management platform as a separate payment service platform in communication with the asset management platform. The asset management platform may be referred to as a single platform, but it should be understood that the features discussed herein may be provided across additional platforms or services in communication with the asset management platform, according to some examples.

Prior systems suffer from the technical inability to electronically collect, manage and cast votes for a group of shareholders owning fractional shares of a stock. In particular, prior systems are incapable of efficiently managing communications needed to represent owners of fractional shares when submitting votes to a computing system that collects voting selections from shareholders in advance of a shareholder vote deadline. Prior systems also suffer from the technical problem of being incapable to electronically implement a proxy system for owners of fractional shares of a stock. In particular, there is no system that efficiently allows a user to electronically implement instructions that grant another user account with the ability to vote on behalf of the owner of a fractional share.

In contrast, the present asset management platform may acquire whole units of stock from one or more third-party sources of securities (e.g., a stock exchange). Users of the asset management platform may purchase fractional shares of the stock acquired by the asset management platform. Once a user purchases a fractional share of stock, the asset management platform may communicate with the issuer of the stock or sources of securities on behalf of the user and the asset management platform. For example, as a common stock shareholder, a user may use a personal mobile device to select one of the voting options (e.g., a voting selection) for an upcoming shareholder voting session of a particular company for which the user owns stock. In doing so, the user may provide his/her voting selection (e.g., casts his/her vote) to the asset management platform.

The asset management platform may then submit the user's voting selection to a central securities depository (CSD) on behalf of the user. A CSD holds securities such as shares either in certificated or uncertificated (dematerialized) form so that ownership can be easily transferred through a book entry rather than the transfer of physical certificates. In addition, a CSD provides dividend, interest, and principal processing, as well as corporate actions including proxy voting. With the present system, each voting selection may be submitted individually or aggregated into a set of user voting selections collected from a number of users of the asset management platform that own that stock to a CSD (e.g., a CSD server via an application programming interface, secure e-mail, or other secure communications mechanism). Some examples of a CSD may include the Depository Trust Company (DTC) of the Depository Trust & Clearing Corporation (DTCC) for American markets, as well as Clearstream and Euroclear for international markets, among others. In some examples, the voting service may submit voting selections to a third-party that transmits the voting selections to a CSD according to an agreement between the third-party and the platform. In other examples, vote collection systems other than CSDs may be used with the present asset management platform.

In some examples, the asset management platform may manage financial accounts for the user. Each financial account may hold a quantity of fiat currency or other assets owned by the user (e.g., cryptocurrencies, discounts, merchant credits, among others). The asset management platform may also have access to financial accounts associated with the user that are managed by third-party systems (e.g., banks).

A user may purchase stock held by the asset management platform using, for example, currency managed by the asset management platform, money in a checking account that the user has authorized the asset management platform to access, cryptocurrency stored in a wallet provided by the asset management platform, other suitable assets, or any combination thereof. In some examples, when a user purchases stock from the asset management platform, the asset management platform may maintain control of the stock and update appropriate ledgers to indicate ownership by the purchasing user. In some examples, shareholder rights associated with the stock, such as shareholder voting rights, may be designated to the purchasing user. The asset management platform may perform actions associated with shareholder rights on behalf of the user according to instructions provided by the user. For example, as a shareholder of common stock, a user may have the right to vote in shareholder voting sessions. The user may indicate a voting selection to the asset management platform using an application on the user's mobile device. The asset management platform may communicate with the CSD to submit the user's voting selection on behalf of the user. According to some examples, the asset management platform may enable proxy voting rights for users to submit voting selections on behalf of another user.

The asset management platform may record and track user ownership of equity shares and the associated shareholder rights by updating system ledgers. In other words, some examples of the present system may manage the transfer of stock and other equity between users and markets by adjusting securities ledgers associated with each user. Similarly, the present system may manage shareholder voting rights associated with a stock by tracking proxy designations submitted by users who hold the voting rights. Through centralized management of ownership in stock and other security assets and the transfer of associated proxy rights using the examples described herein, the asset management platform increases the computational efficiency and memory usage of prior systems that are only capable of monitoring stock ownership.

In some examples, the asset management platform may maintain a data structure designed for managing ownership of stock and the associated asset rights. As an example, the asset management platform may store ledgers for tracking assets held by the asset management platform—each such asset held by the asset management platform may be owned in whole or in part by the asset management platform itself and/or in whole or in part by a user of the asset management platform. The platform ledger(s) may store balances associated with the asset management platform representing quantities of assets held by the asset management platform. The platform ledger(s) associated with the asset management platform may store platform balances including, for example, a fiat currency balance for each of one or more fiat currencies, a cryptocurrency balance for each of one or more cryptocurrencies, a securities balance for each of one or more stock, other suitable data records, or any combination thereof. The asset management platform may also store user ledgers for each of a number of users. The ledger(s) may be stored as part of a user account for each user. One or more ledgers may store user balances representing quantities of assets held by the asset management platform and owned by a user. The platform and user ledgers may also manage rights associated with assets stored by the asset management platform, such as voting rights associated with shares of common stock. The asset management platform may use other data structures suitable for storing information representing ownership of assets.

In some examples, a user may purchase stock from the asset management platform by submitting a request to purchase fractional shares to the asset management platform using an interface of the user's mobile device. The user interface may be provided, for example, in a mobile application provided by the asset management platform, or on a webpage displayed by a browser installed on the user's mobile device or a computing device. The request may specify a particular security asset (e.g., stock of a particular company) and a quantity of the stock to purchase. The asset management platform may compute a price for the requested amount of the security asset, then execute the purchase by updating one or more internal ledgers. For example, the asset management platform may decrease a US dollar balance associated with the user by the computed price and increase an equities balance associated with the user by the requested amount of shares of the specified stock. The asset management platform may correspondingly decrease an equities balance held by the platform by the requested amount of shares of the specified stock.

The computed price for the requested shares of stock may be calculated based on a current market price of the stock rather than the price of the stock at the time the asset management platform secured the stock from the stock exchange (or other seller of the stock). In this case, although the purchased shares of stock are held by the platform, the asset management platform records and tracks user ownership interests using its ledgers. According to some embodiments, the asset management platform may update the user account to reflect voting rights associated with voting shares the stock. Because ownership interests in stock may be transferred by reassigning ownership on the ledgers, the user may be able to purchase fractional shares of the stock. For example, a user may be allowed to buy 0.75 shares of a particular stock. Such flexibility is often unavailable for investment in particular asset classes. In some examples, the user may send a sell order of a particular stock to the asset management platform. The asset management platform may execute this transaction by, for example, increasing a currency balance and decreasing a security balance of the user, while at the same time, decreasing a currency balance and increasing a security balance of the asset management platform.

The asset management platform may also facilitate user-to-user transfer of security assets, such as common shares of stock. In some examples, a first user may transfer a quantity of common shares of stock to a second user via the asset management platform. The asset management platform may receive a request to transfer stock to another user. According to some examples, the request may indicate the first user sending the stock, the second user receiving the stock, the particular stock to be transferred, and a quantity of shares to be transferred.

In response to the request, the asset management platform may execute this transfer by modifying the respective equity balances of the first user and the second user. In some examples, two users may reach a deal to swap assets and may cause the deal to be executed through the asset management platform. Each user may send a digital signature to the asset management platform approving the transaction. In response, the asset management platform may execute the transaction by updating the balances of the users corresponding to the assets. For example, a first user may swap 2.5 shares of a Company A for 110 shares of a Company B owned by a second user. After receiving a corresponding request, the asset management platform may decrease the balance of Company A stock assigned to the first user and increase the balance of Company A stock assigned to the second user. At the same time, the asset management platform may increase the balance of Company B stock assigned to the first user and decrease the balance of Company B stock assigned to the second user. The assets may or may not fall within the same asset class. For example, a first user may similarly swap 1 bitcoin for municipal bonds of a $5,000 face value.

In some examples, the asset management platform provides the ability for users to invest in groups or packs of security assets. The asset management platform may send, to a client device associated with a user, instructions to display one or more recommendations of packs of security assets. Each pack may include various stocks and/or fractional shares of stocks from various companies. The security assets for a particular pack may be identified based on one or more criteria such as industry, stage of growth, risk management, diversity, other suitable criteria, or any combination thereof. As an example, a recommended pack may include twenty stocks associated with ten small-cap companies and ten large-cap companies providing cloud computing services. As another example, a recommended pack may include a combination of stocks, bonds, and gold futures.

Each security asset included in a pack may be assigned a particular weight (e.g., a proportion one stock has relative to other stocks in the pack). The weight may be specified by a currency value at a particular time point (e.g., equivalent U.S. dollar value at the time of purchase of a stock in the pack) or by units used to measure the security assets (e.g., a different number of shares associated with each stock). A user may request to purchase a particular value of a particular recommended pack (e.g., $100 of cloud-computing pack). In response, the asset management platform may calculate a respective value assigned to each of the security assets included in the pack and update data records representing ownership of these assets accordingly. In particular, the asset management platform may debit a currency balance associated with the user in the amount of the particular value while crediting multiple securities balances associated with the user and corresponding to the security assets included in the pack. In some examples, the asset management platform may temporarily credit and debit its own ledgers as a temporary balance. In some examples, the asset management platform may also prompt a user to create a pack of security assets. The user may identify the assets to be included in the pack and the weight assigned to each of the assets.

In some examples, a user may transfer or otherwise assign shareholder rights associated with the user's security assets to another user or group of users by submitting a proxy request to designate a proxy user to submit a voting selection on the user's behalf. The user may submit proxy instructions using a user interface of the user's mobile device similar to that described above. According to some examples, the proxy instructions may specify a particular security asset (e.g., common stock of a particular company) and designate a proxy recipient who is a user of the present system. For example, proxy instructions for shares of a common stock may indicate designating a proxy recipient to submit a shareholder vote on the user's behalf. In some examples, proxy instructions may indicate a request for the asset management platform to determine and recommend a potential proxy recipient based on the similarity of the potential proxy recipient's account activity to that of the shareholder.

In some examples, a user may also submit voting instructions that specify how the asset management platform should determine the user's voting selection. The asset management platform may provide a voting service for gathering, sharing, executing, and facilitating voting instructions, according to some examples. According to some examples, voting instructions may indicate one or more of: the user's voting selection, user voting preferences, and one or more other users for determining a vote. For example, a first user may provide voting instructions indicative of one or more other users with which the first user wishes to combine fractional voting selections. In another example, the first user's voting instructions may provide voting preferences indicative of the most environmentally-conscious vote. The voting service of the asset management platform may identify or determine which voting selection most closely aligns with the user's voting preferences. The voting service may store the voting selection by updating one or more internal ledgers for storing user voting selections and then submitting to the appropriate entity that handles such corporate actions, such as a central securities depository (CSD).

In some examples, the voting service may submit user voting selections immediately. In other examples, the voting service may collect user voting selections stored in the one or more internal ledgers until the platform determines the most efficient time to submit to the CSD. By collecting user voting selections, the asset management platform may collate the user voting selections and transmit collated votes as organized sets of user voting selections. By submitting collated votes indicative of the all collected user voting selections, the asset management platform reduces the number of transmissions and network calls sent to a CSD. Without submitting each voting selection individually, the asset management platform reduces the demand of platform resources over a prolonged period of time providing for reduced platform costs and reliable performance. Furthermore, by determining when to submit the collated votes, the voting service may submit user voting selections during the network's lowest trafficked hours to reduce network congestion, avoid platform failures, and diminish the risk of packet or data loss.

According to some examples, a user may provide voting instructions indicative of one or more other users for determining a voting selection on behalf of the user. Such voting instructions may indicate how the one or more other users may be used to determine a vote such as by combining voting selections with the one or more other users, mirroring the one or more other users' voting selections, and/or transmitting proxy voting rights to the one or more other users, among others. For example, the proxy instructions may indicate at least one other user to which the user's proxy voting rights may be designated. As another example, a first user may provide proxy instructions that indicate one or more users that own fractional shares with which the first user wishes to combine fractional voting shares for totaling to at least one voting share. Accordingly, a request may be sent to the one or more users identified in the voting instructions to indicate that fractional voting shares have been gifted by the first user. The voting service of the asset management platform may be configured to provide fractional voting shares to users with fractional shares of stock. As such, the voting service may be used by the asset management platform to receive fractional voting selections from users and submit to shareholder voting sessions through a CSD, which has previously been unavailable to fractional shareholders.

According to some examples, a user may request that the voting service determine other fractional shareholders with the same voting selection as the user to combine fractional voting selections into one or more merged voting selections. According to some examples, a merged voting selection provides for one or more voting shares. In doing so, the voting service may generate merged vote shares based on a combination of fractional voting selections for submitting to the CSD on behalf of the users. For example, if the voting service receives a first fractional voting selection from a user, the voting service identifies other fractional voting selections from other users that own fractional shares of the same stock that meet a combination qualifier for aggregation with the first fractional voting selection. Combination qualifiers may include fractional voting selections in favor of the same voting option, fractional voting selections with voting shares greater than the difference between the first fractional voting share and one whole share, among others. Alternatively, the voting service may determine one or more other users that meet combination qualifiers. Upon determining fractional voting selections for combination, the voting service may generate one or more merged voting selections based on the fractional voting selections provided by the user and the one or more other users.

The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods. Some frequently used terms are now described.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "may," "can," "could," or "might" be included or have a characteristic, that particular component or feature is not required to be included or have the characteristic.

The term "module" refers broadly to software stored on non-transitory storage medium (e.g., volatile or non-volatile memory for a computing device), hardware, or firmware (or any combination thereof) modules. A module may or may not be self-contained. An application program (also called an "application") may include one or more modules, or a module may include one or more applications.

The preceding summary is provided for the purposes of summarizing some examples to provide a basic understanding of aspects of the subject matter described herein. Accordingly, the above-described features are merely examples and should not be construed as limiting in any way. Other features, aspects, and advantages of the subject matter described herein will become apparent from the following description of Figures and Claims.

FIG. 1 illustrates a flow chart of a fractional voting procedure according to one example as described herein. Fractional voting procedure 100 provides for a voting service for receiving fractional voting selections from users with fractional voting shares. At 102, fractional voting procedure 100 provides notification of shareholder voting rights to a plurality of user accounts with at least a fractional share of stock associated with the shareholder voting rights. In some examples, notification of shareholder voting rights may indicate the amount of voting shares associated with the associated user's equity in the stock. In some examples, the asset management platform may communicate with users over the Internet, among communication methods compatible with users' mobile devices (e.g., SMS/MMS message, LTE/5G data, phone call, email).

Fractional voting procedure 100 may receive user voting selections from the plurality of user accounts at 104. In some examples, a user voting selection may be determined from voting instructions stored in the user account. Fractional voting procedure 100 may determine, at 106, if any of the received user voting selections indicate fractional voting shares. In other words, fractional voting procedure 100 determines which user voting selections amount to less than one voting share, known as fractional voting shares. If any user voting selections indicate fractional voting shares, fractional voting procedure 100 at 108 may extract a first set of user voting selections associated with fractional voting shares in preparation for collation. In some examples, fractional voting procedure 100 extracts a second set of user voting selections associated with integer voting shares at 110 and stores the user voting selections for later transmission. At 112, fractional voting procedure 100 may collate the first set of user voting selections into a set of aggregated fractional votes, each aggregated fractional vote equal to one voting share for submitting on behalf of the user accounts. Upon collating the first set of user voting selections into a set of aggregated fractional votes, fractional voting procedure 100 may submit, at 114, the second set of user voting selections as previously stored and the set of aggregated fractional votes on behalf of the plurality of user accounts.

Figure 2:
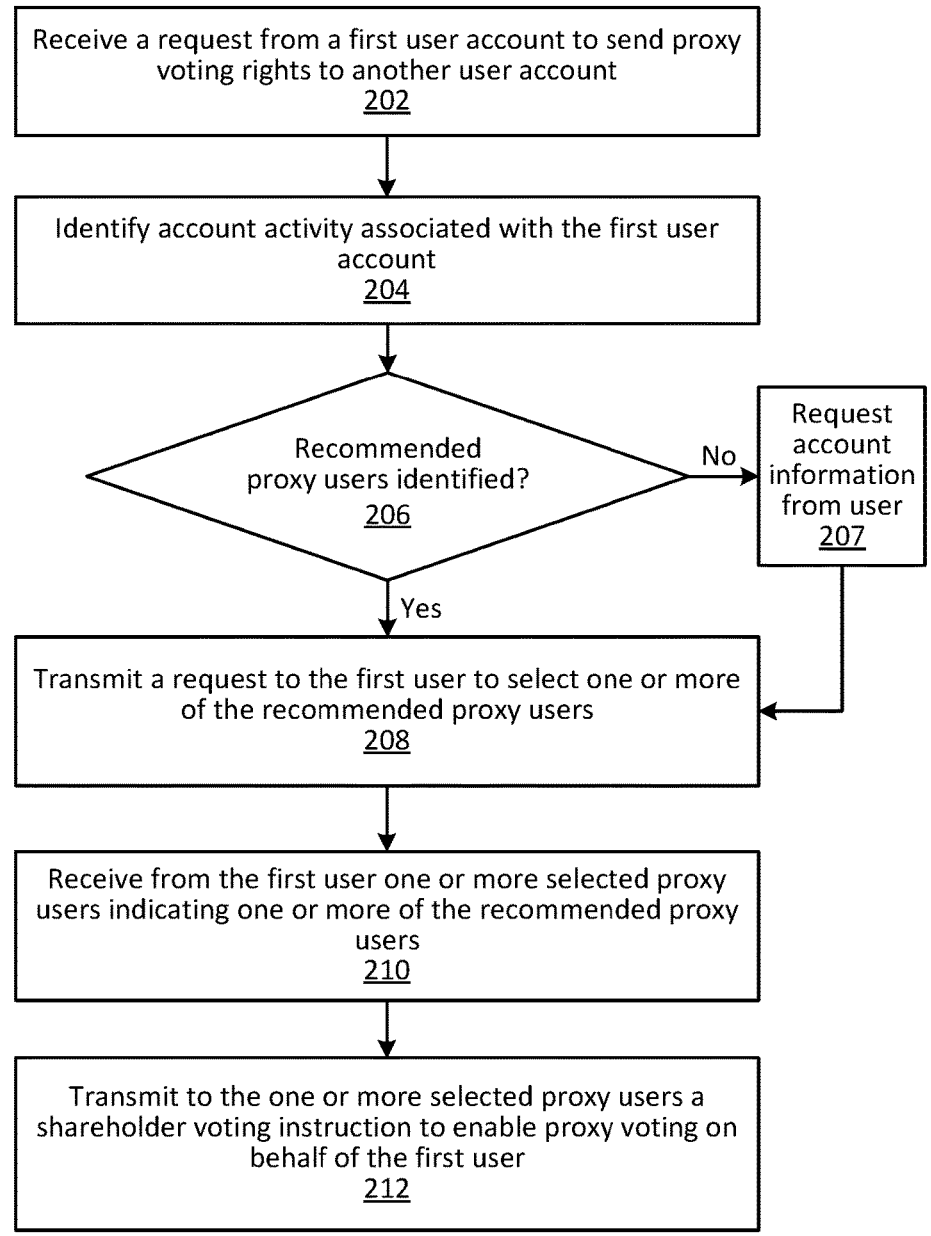
FIG. 2 illustrates a flow chart of a rights sharing procedure according to one example as described herein.

FIG. 2 illustrates a flow chart of a rights sharing service according to one example as described herein. In some examples, the asset management platform may provide for a voting service that implements a rights sharing procedure for facilitating user-to-user transmission of asset rights associated with equity assets stored in their user account. According to some examples, asset rights may include voting rights associated with common stock. The example as shown in FIG. 2 provides for a rights sharing procedure 200 that allows a first user to transmit proxy voting rights associated with a common stock stored in the first user account of the first user. Rights sharing procedure 200 may include receiving a request at 202 from a first user associated with a first user account to send proxy voting rights to one or more proxy user accounts. In some examples, the request to send proxy voting rights may be provided by voting instructions stored in the first user account. The voting instructions may include indications of particular users provided by the first user, referred herein as proxy users. Alternatively, the voting instructions may indicate that the voting service determine one or more recommended proxy users for the first user.

Rights sharing procedure 200 of the voting service may further include identifying account activity associated with the first user at 204 for determining recommended user accounts with similar account activity. According to some examples, account activity may include transaction logs, security ledgers, other asset ledgers, user account data, among other transactional or non-transactional data associated with user accounts. At 206, rights sharing procedure 200 may determine whether recommended proxy users can be identified. In some examples, rights sharing procedure 200 may determine one or more recommended proxy users based on the account activity associated with the first user, such as transaction history and previous equity holdings. In some examples, the recommended proxy users may also be determined based on account activity of other relevant users for transferring the proxy vote thereto. If no recommended proxy users can be identified, more information may be needed about the user—thus a user information request may be transmitted to the user at 207 in order to increase the likelihood that recommended proxy users may be determined in the future, according to some examples. For example, a user may receive a message that requests that the user complete their profile. Upon determining one or more recommended proxy users, rights sharing procedure 200 may further transmit at 208 a request to the first user to select one or more of the recommended proxy users at 208 for sending the proxy vote.

At 210, rights sharing procedure 200 of the voting service may receive from the first user one or more selected proxy users indicative of at least one of the recommended proxy users, according to some examples. Upon receiving one or more selected proxy users, rights sharing procedure 200 may transmit to the one or more selected proxy users a notification to participate in proxy voting on behalf of the first user at 212.

Figure 3:
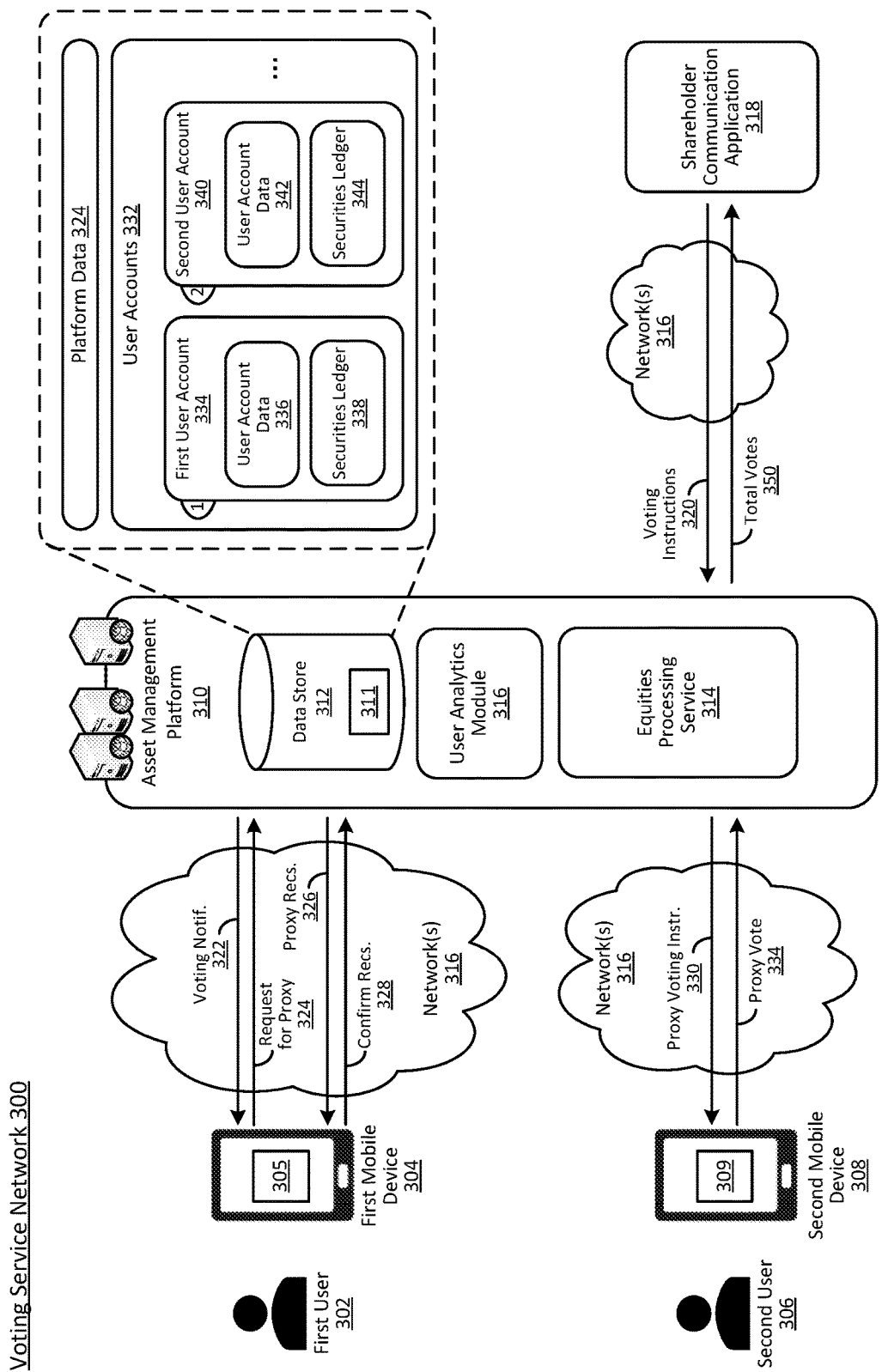
FIG. 3 illustrates an asset management framework according to one example as described herein.

FIG. 3 illustrates an asset management platform providing for a voting service network in accordance with one example as described herein. The voting service network 300 includes first user 302 that wishes to provide proxy voting rights to second user 306, according to some examples. Voting service network 300 also illustrates an asset management platform 310 including a data store 312, user analytics module 316, and an equities processing service 314. Data store 312 may include platform data 324 and user accounts 332. User accounts 332 may include a first user account 334 and a second user account 340 for storing user account data 336 and 342, respectively. Asset management platform 310 may be communicatively coupled to mobile devices, each of which may be associated with a user of asset management platform 310. For example, asset management platform 310 is communicatively coupled to first mobile device 304 associated with first user 302 and second mobile device 308 associated with second user 306 via network(s) 316.

First mobile device 304 and second mobile device 308 may be any mobile or non-mobile device that include instances of a payment application provided by asset management platform 310. The payment application 311 may be stored in data store 312 for providing instances to be installed on mobile devices 304 and 308. First mobile device 304 and second mobile device 308 may send application requests to asset management platform 310. In response, asset management platform 310 may provide instances of payment application 311 back to first mobile device 304 and second mobile device 308. In doing so, asset management platform 310 may map an identification of the instance of the payment application 311 to the respective user accounts 332.

Each instance of the payment application 311 may include an indication of at least one user account of user accounts 332. For example, the instance of the mobile application 305 executing on first mobile device 304 may include an indication of first user account 334 of user accounts 332. Similarly, the instance of the mobile application 309 executing on second mobile device 308 may include an indication of second user account 340 of user accounts 332. Payment applications 305 and 309 may enable first mobile device 304 and second mobile device 308, respectively, to transmit payments of financial assets between first user account 334 (e.g., first user 302) and second user account 340 (e.g., second user 306). Payment applications 305 and 309 executing on first mobile device 304 and second mobile device 308 respectively, may transmit data therebetween or to/from asset management platform 310.

In some examples, asset management platform 310 may be further communicatively coupled via network(s) 316 to receive shareholder materials and other shareholder-related items from a shareholder communication application 318. For example, shareholder communication application 318 may be a third-party service, platform, or other entity for communicating with the appropriate central securities depository (CSD) on behalf of shareholders. In some examples, equities processing service 314 may facilitate communication between asset management platform 310 and shareholder communication application 318 via network (s) 316. In another example, shareholder communication application 318 is a service provided asset management platform 310 for directly communicating with the CSD on behalf of shareholders. In some examples, shareholder communication application 310 may also directly communicate with other entities and market sources including, but not limited to, securities exchanges, brokers, security issuers, among others. Shareholder communication application 318 may receive from a CSD voting instructions 320 for an upcoming voting session associated with an equity managed by asset management platform 310. Equities processing service 314 may then receive voting instructions 320 from shareholder communication application 318.

According to some examples, upon receiving voting instructions 320, equities processing service 314 may transmit to mobile application 305 on first mobile device 304 voting notification 322 indicative of the data provided by voting instructions 320. In some examples, equities processing service 314 may transmit voting notification 322 before, after, or immediately upon receiving voting instructions 320. Equities processing service 314 may provide preemptive notification, follow-up notifications, and other notifications or requests related to securities and the associated rights associated with first user account 334 of first user 302.

In some examples, first mobile device 304 may display data provided by voting notification 322 to first user 302 by way of the graphical user interface of mobile application 305. Using mobile application 305, first user 302 may transmit from first mobile device 304 to asset management platform 310 a proxy authorization request to transmit proxy voting rights to second user account 340, as illustrated at 324. In some examples, proxy authorization request 324 may include an indication of a specified amount of proxy voting shares, proxy instructions (e.g., to combine voting shares), or identification data associated with second user account 340 for transmitting voting rights thereto, among other data. Proxy authorization request 324 may include one or more indications of a specified amount of proxy voting shares. In some examples, asset management platform 310 may receive proxy authorization request 324 from first mobile device 304, wherein mobile application 305 executing thereon includes an indication of first user account 334 of user accounts 332.

Upon receiving proxy authorization request 324, asset management platform 310 may identify proxy instructions in proxy authorization request 324 that indicate a request to transmit proxy voting rights to second user 306 and determine whether first user account 334 contains voting shares (or an aggregate value of voting shares) greater than or equal to the specified amount of voting shares as indicated by proxy authorization request 324. For example, proxy authorization request 324 may indicate transferring proxy voting rights amounting to 0.75 voting shares stored in first user account 334. Asset management platform 310 may determine whether first user account 334 contains at least the specified amount of voting shares in order to transfer proxy voting rights to second user 306. If first user account 334 does not contain at least the specified value amount of voting shares, asset management platform 310 may transmit to payment app 305 of first mobile device 304 an indication that first user account 334 has insufficient voting shares to complete proxy authorization request 324. In some examples, the indication of insufficient voting shares may provide a recommendation to the user to request, borrow, or combine voting shares with other users of the asset management platform 110.

In other examples, first user 302 may provide or indicate a payment method for purchasing enough shares of stock to initiate the transfer of proxy voting rights as indicated in the proxy authorization request 324. Alternatively, first user 302 may request a loan from asset management platform 310 with predetermined or custom contract conditions in order to account for the transfer of voting rights. Loans with predetermined contract conditions may also be suggested to first user 302 by asset management platform 310 in the event that a loan may need to be facilitated. The predetermined contract conditions may be set by asset management platform 310, including a predetermined time frame and a suggested interest rate, based on transaction activity associated with first user 302. For example, asset management platform 310 may determine that first user 302 can afford to pay weekly or monthly loan installments at a certain interest rate based on the income flow and transaction activity associated with first user 302. First user 302 may approve or deny the suggestion for a loan using mobile application 305 executing on first mobile device 304. According to another example, a loan with custom contract conditions may be designed by first user 302 and submitted as a request for approval to asset management platform 310. The custom contract conditions may be enabled by a drafting procedure provided by asset management platform 310 and facilitated by mobile application 305 executing on first mobile device 304. The option to request a loan may be a feature provided by asset management platform 310 to be facilitated through the mobile application (e.g., mobile application 304) on a user's mobile device (e.g., first mobile device 304).

In any event, once asset management platform 310 can confirm that first user account 334 has sufficient voting shares for transferring the requested amount of proxy voting rights as indicated by proxy authorization request 324, asset management platform 310 may debit the specified proxy voting rights from securities ledger 338 of first user account 334 and credit securities ledger 344 of second user account 340 according to the proxy authorization request 324. According to some examples, the specified proxy voting rights may be credited to a securities ledger of platform data 324 associated with asset management platform 310 in the interim while awaiting confirmation or an indication of acceptance from second user 306. According to some examples, transmitting the specified amount of proxy voting rights from first user account 334 to platform data 324 may include debiting from first user account 334 and crediting or depositing to platform data 324.

According to some examples, authorization request 324 may indicate proxy instructions requesting that the asset management platform determine one or more proxy user recommendations best suited for voting on behalf of first user 302. In some examples, proxy user recommendations may be determined by user analytics module 316 of asset management platform 310. User analytics module 316 may generate proxy user recommendations for first user 302 based on account activity stored in first user account 334, such as transaction logs, ledger data, and other user account data 336 associated with first user 302. User analytics module 316 may further compare such account activity and identify users with similar account activity.

According to some examples, upon determining one or more proxy user recommendations, user analytics module 316 of asset management platform 310 may transmit to mobile application 305 on first mobile device 304 an indication of the determined user proxy recommendations 326. In some examples, the user may interact with the one or more elements in a user interface of mobile application 305 to select one or more of the user proxy recommendations. Mobile application 305 may then transmit to asset management platform 310 the user's confirmation of one or more proxy user recommendations 328, according to some examples.

In some examples, asset management platform 310 may determine that confirmation 328 indicates second user 306 as first user 302's confirmed proxy user recommendation. Asset management platform 310 may identify second mobile device 308 associated with second user 306 and transmit to second mobile device 308 proxy voting instructions 330. In some examples, proxy voting instructions 330 may include data indicative of or similar to data provided by voting instructions 320. Proxy voting instructions 330 may further include, but are not limited to, an indication (via mobile application 309, SMS/MMS, e-mail, etc.) that first user 302 transmitted a specified amount of proxy voting rights and designated second user 306 as the proxy voter for the upcoming voting session. Upon receiving proxy voting instructions 330, mobile application 309 may display to second user 306 a graphical user interface for submitting a proxy voting selection according to proxy voting instructions 330. Second user 306 may interact with elements of the graphical user interface and transmit to equities processing service 314 of asset management platform 310 an indication of a proxy voting selection 334. Equities processing service 314 may receive and process proxy voting selection 334, as well as user voting selections submitted by other users in preparation to submit on behalf of the users. In some examples, equities processing service 314 may submit voting selections on behalf of users immediately upon receiving them from users. In other examples, equities processing service 314 generates collated votes 350 and submits them to shareholder communication application 318. Shareholder communication application 318 communicates with the appropriate CSD to report votes (e.g., voting selections, collated votes 350) on behalf of the users. According to some examples, shareholder communication application 318 may be a vote aggregation or equity communication service provided by a third-party entity (e.g., shareholder materials delivery service, voting application provider, vote tabulator, among others) that communicates with asset management platform 310 over network(s) 310. In some examples, shareholder communication application 318 may be an internal service provided by asset management platform 310 for directly reporting votes (e.g., voting selections, collated votes 350) to the appropriate CSD on behalf of the users.

According to some examples, equities processing service 314 updates the ledgers and other records of both the platform data 324 and user accounts 332 in data store 312. The updates indicate the transfer by first user 302 of proxy voting rights to designate second user 306, the submission of proxy voting selections by second user 306, as well as other data related user voting selections received by the equities processing service 314 and other components of asset management platform 310.

Furthermore, some examples may provide for a graphical user interface to be displayed to second user 306 on second mobile device 308 indicating that with the proxy voting selection 334 has been submitted on behalf of first user 302 and may further indicate results or other return messages from shareholder communication application 318 or the appropriate CSD. The graphical user interface may be generated by mobile application 309 or displayed by the operating system of second mobile device 308 (e.g., SMS/MMS, e-mail, etc.).

Figure 4:
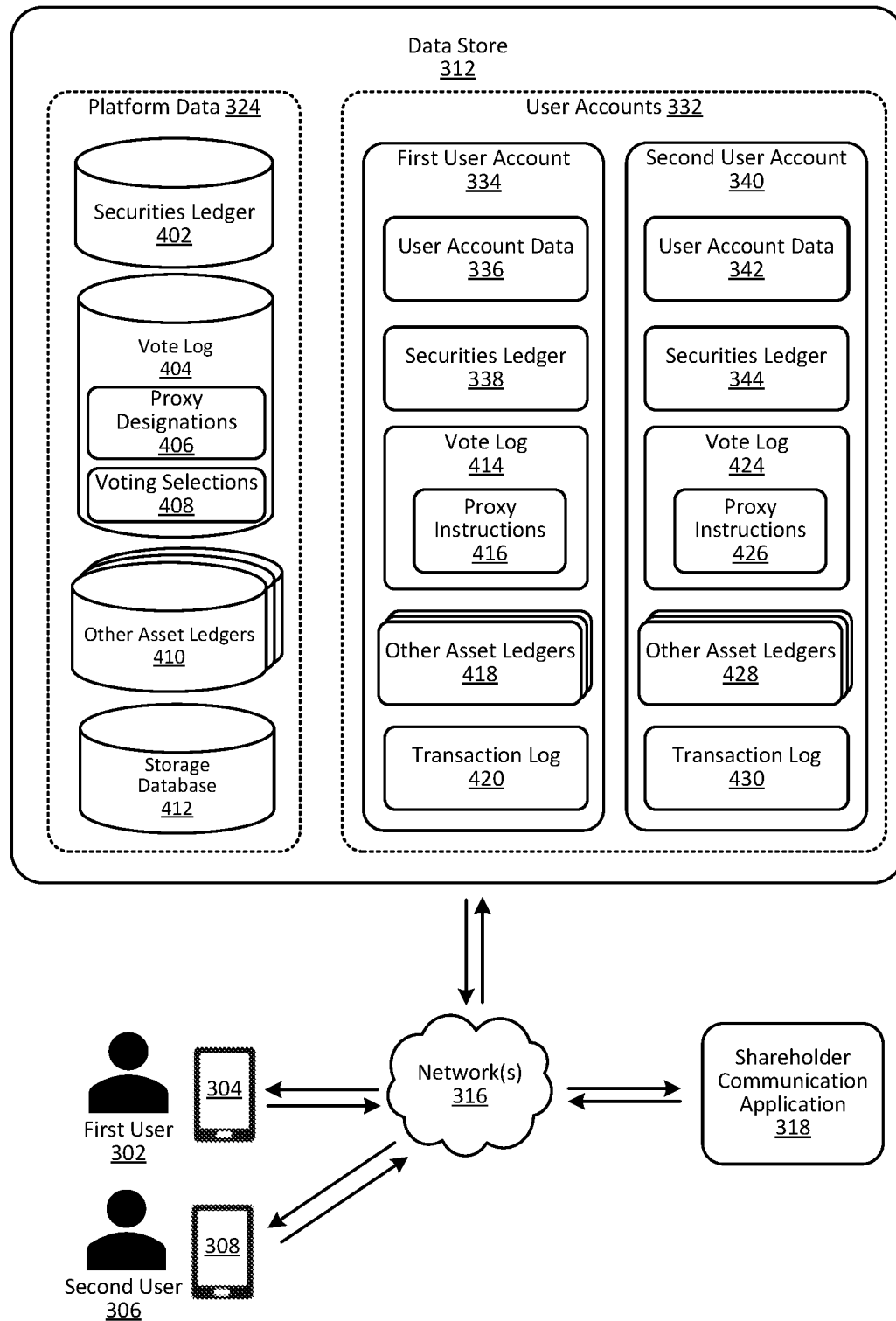
FIG. 4 illustrates a data store framework according to one example as described herein.

FIG. 4 illustrates a data store framework of a data management platform in accordance with one example embodiment. As described above, data store 312 of asset management platform 310 may include platform data 324 and user accounts 332. Platform data 324 may include securities ledger 402, vote log 404, and other asset ledgers 410 for other assets (e.g., merchant credits, merchant discounts, product discounts, services discounts, portions of equities, cryptocurrencies, fiat currencies, combinations thereof, among others) managed by the asset management platform. Securities ledger 402 may be used to store or record debits and credits of security value associated with asset management platform 310. Examples of security value may include, but are not limited to, shares of common/preferred stock or a group of shares of common/preferred stocks, shareholder equity, shareholder dividends, foreign exchange products, earnings from financial assets, other exchangeable or non-exchangeable assets of financial values, as well as fractional portions thereof. According to some examples, security values managed by securities ledger 402, such as shares of common/preferred stock, may be associated with shareholder rights. For example, common stock managed by securities ledger 402 may be associated with shareholder voting rights tracked by a vote log 404.

Vote log 404 may be used to record votes associated with security value recorded by securities ledger 402. For example, common stock managed by securities ledger 402 may be associated with shareholder voting rights exercisable by shareholders of the particular common stock or designated proxy voters thereof in some examples, vote log 404 may further record the designation of proxy voting rights associated with common stock and maintain such records in proxy designations 406. Vote log 404 may further receive and record voting selections submitted by users, groups of users, or the asset management platform itself. Voting selections that are received and recorded may be stored as voting selections 408. Voting selections 408 may include fractional voting selections, integer voting selections, and a combination thereof. Voting selections 408 may further include user voting selections and proxy voting selections, according to some examples.

Other asset ledgers 410 may include a merchant credit ledger used to store or record debits and credits of merchant credit associated with asset management platform. Examples of merchant credit may include, but are not limited to, merchant gift cards, merchant discounts, or other value exchangeable during transactions with one or more merchants. Other asset ledgers 410 may further include a cryptocurrency ledger used to store or record debits and credits of cryptocurrency associated with the asset management platform. Examples of cryptocurrency may include, but are not limited to, Bitcoin, Ethereum, Litecoin, Ripple, as well as other cryptography-supported digital assets. Other asset ledgers 410 may further include a fiat currency ledger used to store or record debits and credits of fiat currency associated with the asset management platform. Examples of fiat currency may include, but are not limited to, the US Dollar, European Euro, Chinese Yuan, Japanese Yen, British Pound, as well as other government-backed currencies.

As the ledgers of platform data 324 (e.g., securities ledger 402, other asset ledgers 410) may be used to track the credits and debits of each digital asset associated with the asset management platform, storage database 412 may be used to store the assets tracked, organized, and represented by the associated ledger. Accordingly, storage database 412 may include storage locations associated with each asset ledger. For example, storage database 412 may include a cryptocurrency wallet used to store the actual cryptocurrency recorded by the cryptocurrency ledger of other asset ledgers 410.

As described above, user accounts 332 of asset management platform 310 may include a first user account 334 and second user account 340. Each of user accounts 332 may store user account data associated with each user, as well as information related to the respective balances of digital assets and transaction activity associated with each user account. For example, first user account 334 includes user account data 336 as described in FIG. 3 used to store data associated with first user account 334. Similarly, second user account 340 includes user account data 342 used to store data associated with second user account 340. User account data 336 and 342 may include access to external financial accounts, such as broker accounts, bank accounts, cryptocurrency exchanges, among others. For example, user account data 336 may include an indication of an upcoming shareholder meeting associated with an equity stored by the first user account 334. As a further example, user account data 342 may include credentials that grant access to one or more accounts, such as a bank account associated with second user account 340. User account data 336 and 342 may further include access to other payment networks, such as external payment card networks to facilitate transactions with credit cards, debit cards, and the like. According to some examples, user account data 336 and 342 may further include preference profiles or user account models indicative of user preferences maintained by asset management platform 310.

Similar to platform data 324, each user account of user accounts 332 may include an individual ledger for storing securities, a log for recording votes, and other asset ledgers. For example, first user account 334 includes securities ledger 338 used to store or record debits and credits of security values owned by first user account 334. Similarly, second user account 340 includes securities ledger 344. First user account 334 further includes vote log 414 and second user account 340 includes vote log 424 for recording user voting selections submitted by users of first user account 334 and second user account 340. In some examples, vote logs 414 and 424 may record proxy voting selections submitted by proxy voters designated by first user account 334 and second user account 340. Vote logs 414 and 424 may further include proxy instructions 416 and 426 which indicate instructions or other voting preferences provided by or determined for the first user account 334 and second user account 340 respectively. For example, proxy instructions 416 may indicate instructions for the data management platform to submit votes on behalf of first user account 334 according to the proxy voting selections submitted by second user account 340 recorded in vote log 424.

User accounts 332 may also include other asset ledgers associated with each user account. For example, first user account 334 includes other asset ledgers 418 and second user account 340 includes other asset ledgers 428. User accounts 332 may further include transaction logs for each user account. First user account 334 may include transaction log 420 and second user account 340 may include transaction log 430, according to some examples. Transaction logs 420 and 430 may be used to store or record transaction data indicative of each transaction associated with first user account 334 and second user account 340, respectively. Transaction data recorded by transaction logs 420 and 430 may include, but are not limited to, type of asset transacted, value of asset, date of transaction, among others. For example, transaction logs may record that first user account 334 transmitted 5 common shares of stock to second user account 340 on a particular date. As stated above, storage database 412 may be used to store the assets tracked, organized, and represented by the asset ledgers of each of user accounts 332. Each user account data 336 and 342 of user accounts 332 may also include access to external accounts that facilitate such digital assets, such as third party cryptocurrency exchanges/wallets, equity holding accounts, among others.

Figure 5:
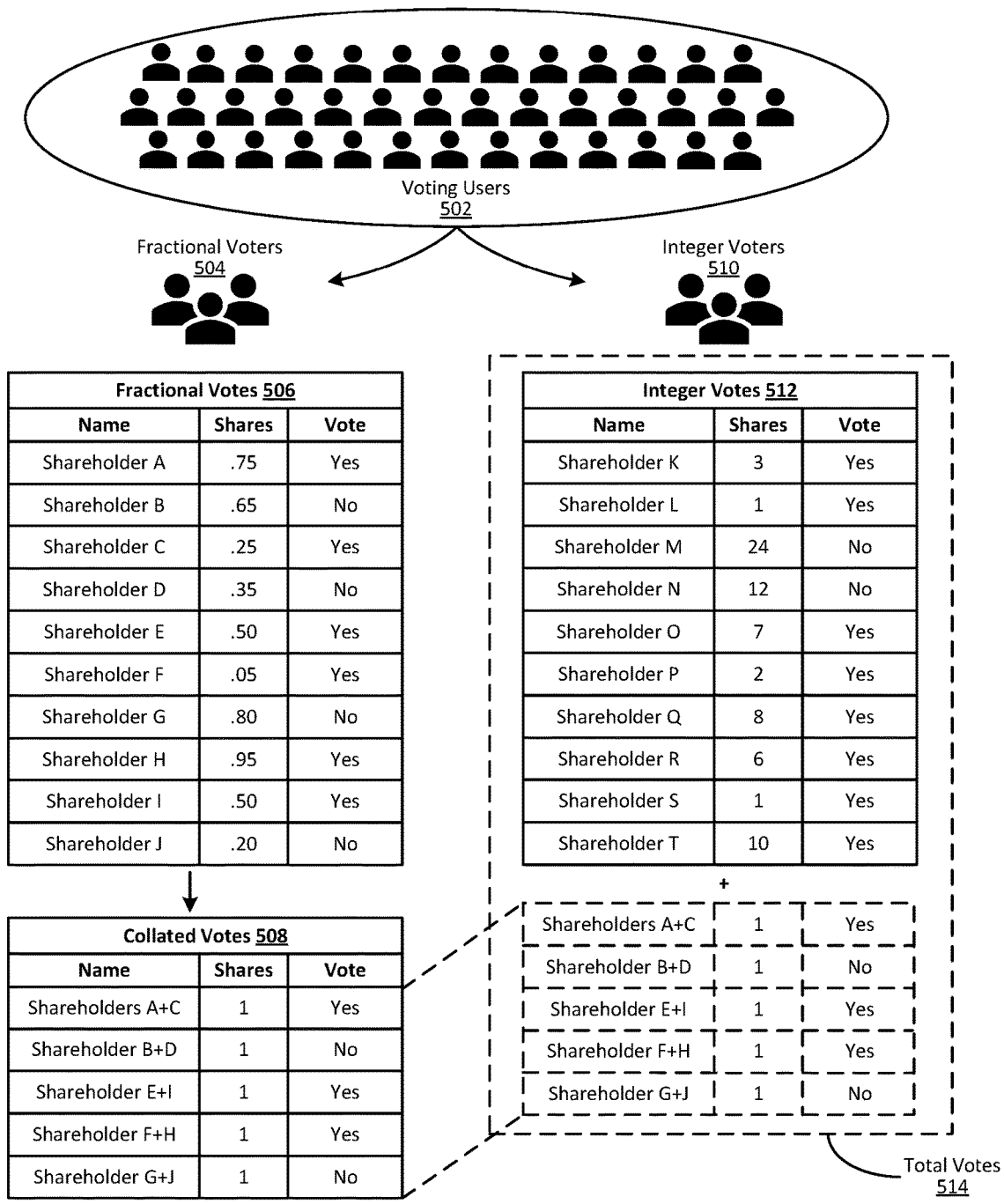
FIG. 5 illustrates a fractional voting system according to one example as described herein.

FIG. 5 illustrates a fractional voting system according to one example as described herein. According to some examples, users of asset management platform (e.g., asset management platform 310) may use voting service (e.g., voting service 300) for facilitating fractional voting. In some examples, users associated with an upcoming shareholder voting session may receive a notification indicative of the shareholder voting session. In response, users may provide a request to designate a proxy (e.g., proxy authorization request 324) for proxy voting or submit a voting selection. The asset management platform may further submit a voting selection on behalf of a user according to proxy instructions (e.g., proxy instructions 416, proxy instructions 426) stored in the user's account.

Voting users 502 may submit voting selections to the asset management platform according to each user's amount of voting shares associated with the amount of common shares of stock stored by the user's account (e.g., securities ledger 338). In some examples, the voting service may determine the value of each voting share upon receiving voting selections from voting users. For example, fractional voters 504 may submit fractional voting selections 506 and integer voters 510 may submit integer voting selections 512. After determining fractional voting selections 506 and integer voting selections 512, the voting service may collate, combine, or determine the best combination of voting selections to achieve the most integer voting shares for submitting on behalf of the fractional voters 504. The voting service determines collated voting selections 508 from fractional voting selections 506. Integer voting selections 512 and collated voting selections 508 may be combined or collected into one or more vote submissions for transmitting to the appropriate CSD.

Figure 6:
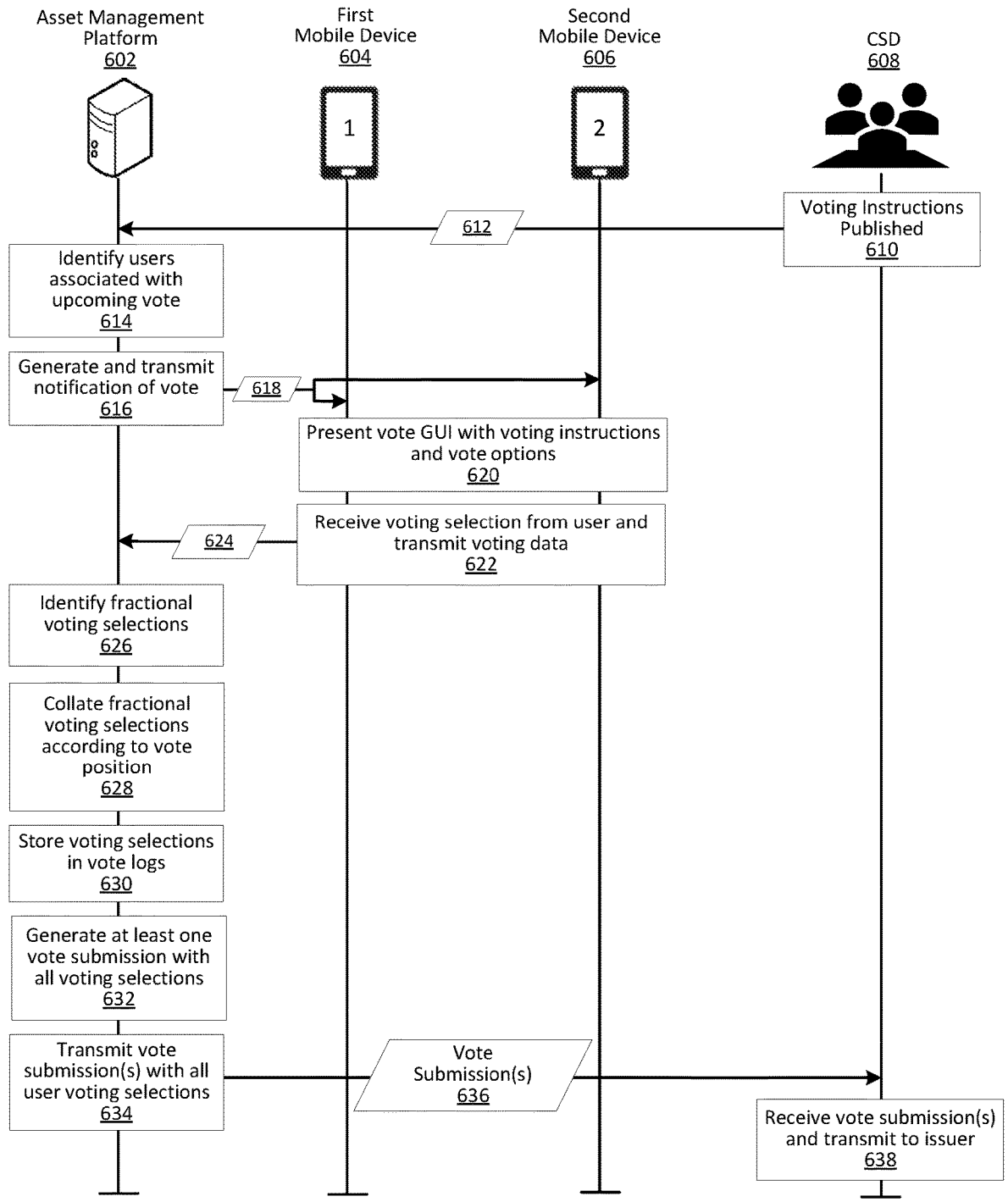
FIG. 6 illustrates a method for submitting fractional votes according to one example as described herein.

FIG. 6 illustrates a method for submitting fractional votes according to one example as described herein. According to some examples, asset management platform 602 (e.g., asset management platform 310) may communicate with a first mobile device 604 of a first user (e.g., first user 302), a second mobile device 606 of a second user (e.g., second user 306), as well as a central securities depository (CSD) 608. In some examples, asset management platform 602 may communicate with CSD 608 by way of a shareholder communication application (e.g., shareholder communication application 318) or a similar middle-man service or third party entity.

According to some examples, CSD 608 may publish information at 610 indicating an upcoming shareholder meeting, distributing a copy of shareholder voting instructions 612 to asset management platform 602. Shareholder voting instructions 612 may indicate information related to the voting session during the upcoming shareholder meeting, a report detailing performance information of the issuer of the stock (e.g., the company), among other investor information and relevant details. Upon receiving voting instructions 612, asset management platform 602 may identify (614) the users associated with the voting instructions 612, such as users that hold equity or common stock indicated by voting instructions 612 or users assigned associated proxy voting rights. According to some examples, asset management platform 602 may generate and transmit (616) a vote notification based on the shareholder voting instructions 612. Asset management platform 602 transmits vote notification 618 to the users that own shares of the common stock associated with shareholder voting instructions 612 and users designated with the relevant proxy voting rights. In some examples, vote notification 618 may be transmitted to applications executing on first mobile device 604 and second mobile device 606, both of which are associated with users who own at least a fraction of equity associated with shareholder vote instructions 612.

At 620, a graphical user interface (GUI) may be presented on first mobile device 604 and second mobile device 606 displaying instructions provided by vote notification 618, as well as GUI elements indicative of voting options through which a user may submit a voting selection. Users may submit voting selections according to the amount of equity indicated in their associated account (e.g., securities ledger 338, securities ledger 344), as well as votes-per-share information indicated in the published shareholder voting instructions 612. In some examples, users may submit one or more voting selections per equity share. For example, if a user's' account (e.g., security ledger) indicates three (3) shares of common stock, the user may submit one or more voting selections totaling to no more than three (3) voting shares. The user may choose to submit two (2) voting selections towards a first option (e.g., "in favor") and one (1) voting selection towards a second option (e.g., "against"). Similarly, the user may choose to submit fractional voting selections that total to no more than (3) voting shares. In this example, a user may choose to submit one-half (½) voting selection toward a first option and two and a half votes (2½) voting selections towards a second option. Further still, in some examples, users with less than one (1) voting share (e.g., users that own fractional shares of common stock) may submit one or more fractional voting selections totaling to no more than the fractional voting share indicated in the user's account. For example, if a user's account indicates three-quarters (¾) of a voting share, the user may submit one or more voting selections totaling to no more than three-quarters (¾) of a voting share. The user may choose to submit one quarter (¼) of a voting selection towards a first option (e.g., "in favor"), one quarter (¼) of a voting selection towards a second option (e.g., "against"), and one quarter (¼) of a voting selection towards a third option (e.g., "neutral"). Accordingly, no matter the amount of voting shares represented in a user's account, the user may submit at least a fractional voting selection up to the amount of voting shares represented in the user's account, according to some examples.

Once the associated user submits a voting selection by way of one or more GUI elements, first mobile device 604 and second mobile device 606 may receive and transmit (622) voting data 624 indicative of each of the users' submitted voting selections. Asset management platform 602 may receive voting data 624 and identify the fractional voting selections provided in voting data 624. According to some examples, the first user submitted a fractional voting selection through first mobile device 604 and the second user submitted a fractional voting selection through second mobile device 606. Therefore, data management platform 602 identifies at least a first fractional voting selection from the first user and a second fractional voting selection from the second user. Upon recognizing fractional voting selections, the data management platform 602 collates (630) the fractional voting selections to determine at least one merged voting selection according to each fractional voting selection's position. Each merged voting selection may be a group of two or more fractional voting selections submitted by users. Collating fractional voting selections may include aggregating fractional voting selections in a manner that achieves the most merged voting selections. For example, fractional voting selections indicative of a first option (e.g., "in favor") are assembled into a first collated group totaling to five (5) complete voting shares and fractional voting shares indicative of a second option (e.g., "against") are assembled into a second collated group totaling to three (3) complete voting shares.

Once fractional voting selections have been collated into one or more groups, data management platform 602 may store voting selections (630) submitted by users in a vote log (e.g., vote log 404) as user voting selections (e.g., user voting selections 408). Voting selections may further be stored in each user's vote log in their associated account (e.g., vote log 414, vote log 424). In some examples, voting selections may be recorded along with an indication of the one or more groups as it was collated thereto. Asset management platform 602 may then generate at least one vote submission (632) indicating at least a portion of voting selections submitted by users for transmitting to CSD 608. In some examples, the vote submission(s) may be a collection of voting selections and groups of voting selections in a compressed format for efficiently storing and transmitting to CSD 608. In some examples, asset management platform 602 may transmit (634) to CSD 608 each of the one or more vote submissions 636. In other examples, the one or more vote submissions 636 may be stored for transmitting at the most efficient time for the platform. In some examples, vote submission(s) 636 may be stored due to other reasons, such as to comply with submission times indicated by shareholder voting instructions 612 or other related reasons. Once released for transmission, vote submission(s) 636 may be received by CSD 608 and, in turn, transmitted to issuer at 638.

Figure 7A:
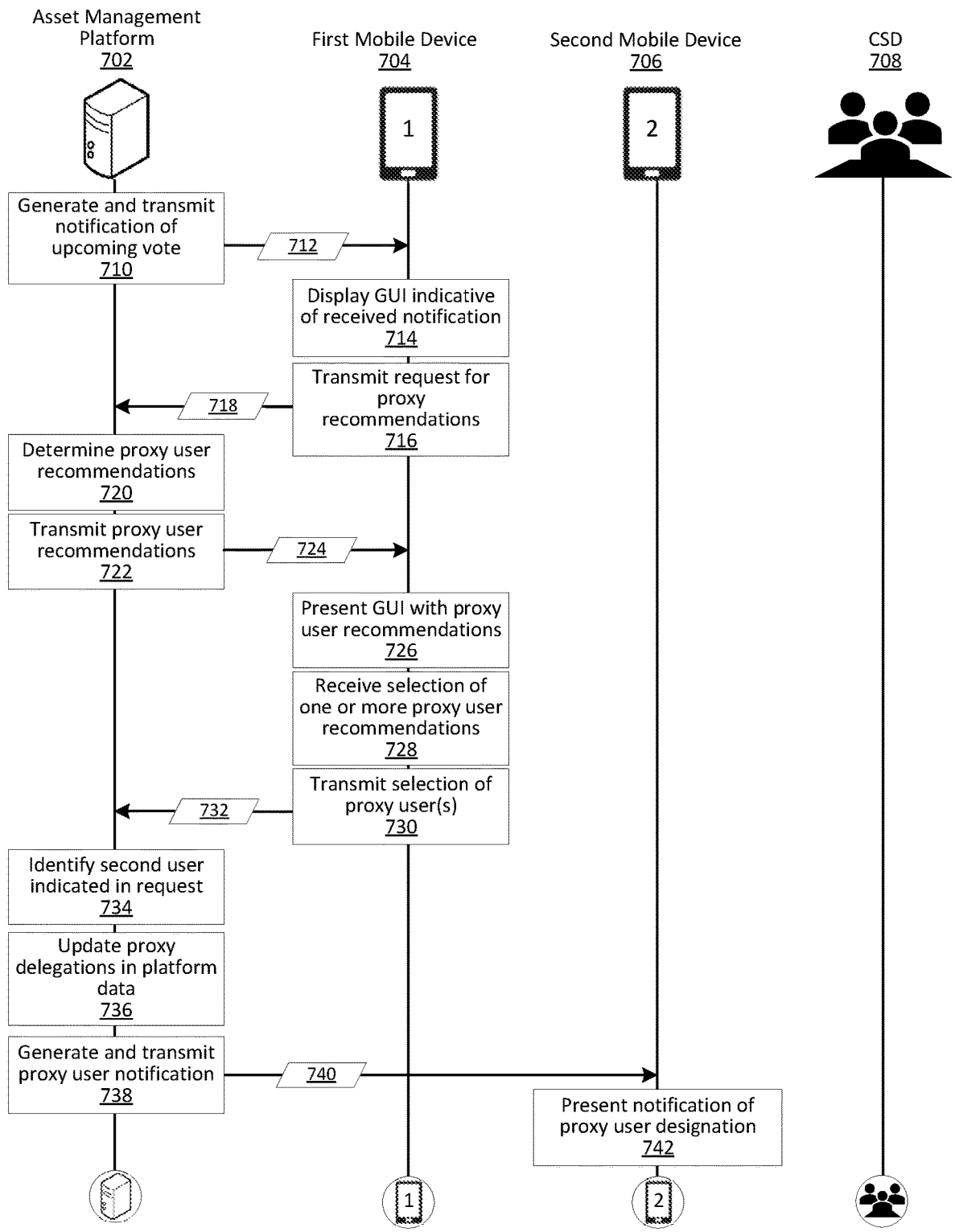
FIG. 7A illustrates a method for sharing voting rights according to one example as described herein.

FIG. 7A illustrates a method for sharing voting rights according to one example as described herein. In some examples, asset management platform 702 (e.g., asset management platform 310, asset management platform 702) may generate and transmit (710) to an application executing on first mobile device 704 a notification 712 reminding a first user of a shareholder voting session during an upcoming shareholder meeting. In some examples, notification 712 may be a reminder that proxy instructions are not yet stored in the user account associated with the user of first mobile device 704. In some examples, first mobile device 704 may display a GUI (714) associated with notification 712. In some examples, the first user of first mobile device 704 may use the GUI of first mobile device 704 to submit a request 718 for proxy user recommendations. Request 718 for proxy user recommendations may be submitted as a proxy authorization request (e.g., proxy authorization request 324), according to some examples. Accordingly, first mobile device 704 may transmit a request 718 for proxy user recommendations (716). In some examples, request 718 may further indicate a request to transmit proxy voting rights to a particular second user as indicated by the first user.

In some examples, upon receiving request 718, asset management platform 702 may determine or generate proxy user recommendations (720) according to account activity of the first user and other users. In some examples, proxy user recommendations may be generated based on data associated with the first user account, such as the user account's voting history (e.g., vote log 414), transaction activity (e.g., transaction log 420), a preference profile associated thereto (e.g., user account data 336), securities or other assets owned by the user (e.g., securities ledger 338, other asset ledgers 418), or a combination thereof, among other data. In some examples, asset management platform 702 may further determine or generate proxy user recommendations based on data associated with other user accounts, such as a second user account's vote log (e.g., vote log 424), transaction activity (e.g., transaction log 430), a preference profile associated thereto (e.g., user account data 342), securities or other assets owned by the user (e.g., securities ledger 344, other asset ledgers 428), or a combination thereof, among other data. In some examples, proxy user recommendations may be determined by identifying user accounts with data similar to that of the first user.

In some examples, proxy user recommendations may be determined based on a probability map generated or maintained by asset management platform 702. The probability map may indicate one or more second users with transactions, preferences, opinions, activities, locations, and other indicators that are most correlated or most similar to that of the first user. In some examples, the probability map may be generated dynamically for each set of proxy user recommendations provided to the first user. The probability map may also be generated using previously determined probability maps associated with the first user. Accordingly, the probability map may be stored in the data store of asset management platform 702 for later use in determining other probability maps or proxy user recommendations at a future time.

Once proxy user recommendations are determined, the asset management platform 702 may transmit the recommendations (722) to first mobile device 704. In some examples, proxy user recommendations transmission 724 may indicate one or more users determined to be most correlated to the first user. First mobile device 704 may present a GUI (726) with proxy user recommendations displayed therein. The first user may select one or more proxy user recommendations using the GUI of first mobile device 704. First mobile device 704 may receive the first user's selection of one or more proxy user recommendations (728) and transmit the selection (730) to asset management platform 702. Accordingly, user proxy selection 732 may include one or more proxy user recommendations according to the selection provided by the first user.

Asset management platform 702 may identify a second user (734) from user proxy selection 732. In some examples, asset management platform 702 may then update proxy designations (e.g., proxy designations 406) as stored in a vote log (e.g., vote log 404) of the platform's data store. In some examples, data stores associated with the user accounts of each user (e.g., first user account 334, second user account 340) may be updated to reflect the allocation of proxy voting rights to the second user. For example, proxy instructions of the first user account (e.g., proxy instructions 416) may be updated to reflect designating the second user as the proxy user for the voting session indicated by the first user. Similarly, proxy instructions of the second user account (e.g., proxy instructions 426) may be updated to reflect receiving proxy voting rights for the associated vote. According to some examples, asset management platform 702 may generate and transmit a proxy user notification (738) to second mobile device 706. Upon receiving proxy user notification 740, second mobile device 706 may present a GUI (742) indicating that the second user has been designated as the proxy user for the voting session indicated by the first user.

Figure 7B:
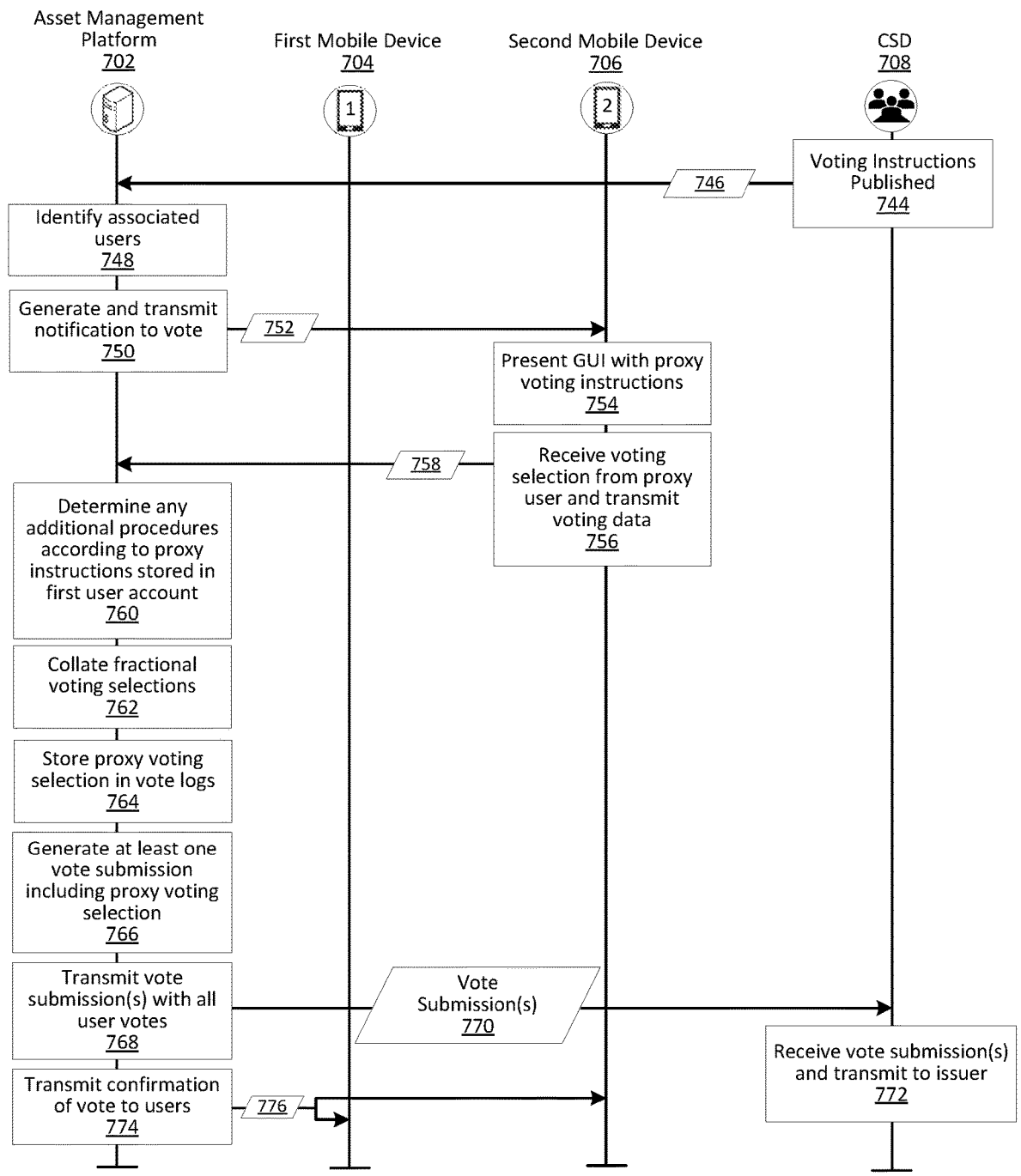
FIG. 7B illustrates a method for sharing voting rights according to one example as described herein.

FIG. 7B illustrates a method for sharing voting rights according to one example as described herein. In some examples, FIG. 4B may be understood and interpreted as a continuation of FIG. 4A. According to some examples, CSD 708 may publish information at 744 indicating an upcoming shareholder meeting, distributing a copy of shareholder voting instructions 746 to asset management platform 702. Shareholder voting instructions 746 may indicate information related to the voting session during the upcoming shareholder meeting, a report detailing performance information of the issuer (e.g., the company), among other investor information and relevant details. Upon receiving shareholder voting instructions 746, asset management platform 702 may identify (748) users indicated by the voting instructions 746, such as users that own shares of the associated common stock. In some examples, the asset management platform 702 may reference a proxy designations log (e.g., proxy designations 406) of the platform to identify the second user designated as the proxy user for the first user. In some examples, the asset management platform 702 may reference proxy instructions (e.g., proxy instructions 416) stored in the user account of each user indicated by the voting instructions 746.

According to some examples, asset management platform 702 may generate and transmit (750) a vote notification generated based on shareholder voting instructions 746. Asset management platform 702 may transmit proxy vote notification 752 to an application executing on second mobile device 706 associated with the second user designated as the proxy user for the first user. In some examples, a GUI may be presented (754) on the second mobile device 706 for displaying instructions provided by proxy vote notification 752, as well as GUI elements indicative of voting options through which the proxy user may submit a vote. In addition to the information related to voting instructions 746, proxy vote notification 752 may further indicate information related to how the first user might have voted as determined by asset management platform 702, according to some examples. Such information may also be presented by second mobile device 706 in order to assist the second user with submitting a proxy vote. Once the second user provides a voting selection using one or more GUI elements, second mobile device 706 may transmit (756) proxy voting data 758 indicative of the proxy voting selection.

In some examples, upon receiving proxy voting data 758, asset management platform 702 may determine whether additional procedures may be necessary according to proxy instructions stored in the first user account (760). For example, the first user account may have stored therein proxy instructions which indicate that if the proxy voting data 758 does not match the preference profile of the first user, then the proxy vote should not be submitted. In some examples, the additional procedures indicated by proxy instructions of the first user account may be referred to as post-proxy procedures. Other examples of post-proxy procedures may be provided. Once post-proxy procedures have been completed or determined not needed, asset management platform 702 may collate any fractional votes (760) as described above.

Asset management platform 702 may then store proxy voting data 758 submitted by the second user in associated vote logs (762). For example, proxy voting data 758 may be recorded in a platform vote log (e.g., vote log 404) as voting selections (e.g., voting selections 408), as well as in users' individual vote logs (e.g., vote log 414, vote log 424). Asset management platform 702 may then generate at least one vote submission (766) indicating proxy voting data 758, as well as at least a portion of other votes submitted by users for transmitting to CSD 708. In some examples, the vote transmission(s) may be a collection of user voting selections, proxy voting selections, and groups of voting selections in a compressed format for efficiently storing and transmitting to CSD 708. In some examples, asset management platform 702 may transmit (734) to CSD 708 each of the one or more vote submissions 770. In other examples, the one or more vote submissions 770 may be stored for transmitting at the most efficient time for the platform. In some examples, vote submission(s) 770 may be stored for other reasons, such as to comply with submission times indicated by shareholder voting instructions 746 or other related reasons. Once transmitted, vote submission(s) 770 containing the proxy voting selection may be received by CSD 708 and, in turn, transmitted to the issuer at 772. Thus, the proxy voting selection is submitted on behalf of the first user account. In some examples, asset management platform 702 may notify users of the successful vote submission(s) by transmitting (774) a voting confirmation 776 to the first user and second user.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some examples, a service can be software that resides in memory of a client device and/or one or more servers of a content management system and perform one or more functions when a processor executes the software associated with the service. In some examples, a service is a program, or a collection of programs that carry out a specific function. In some examples, a service can be considered a server. The memory can be a non-transitory or transitory computer-readable medium.

In some examples the computer-readable storage devices, mediums, and memories can include a cable or wireless signal containing a bit stream and the like. However, when mentioned, transitory computer-readable storage media are media such as energy, carrier signals, electromagnetic waves, and signals per se.

Methods according to the above-described examples can be implemented using computer-executable instructions that are stored or available from computer readable media. Such instructions can include, for example, instructions and data which cause or configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can include hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Having now fully set forth examples and certain modifications of the concept underlying the present invention, various other examples as well as certain variations and modifications of the examples shown and described herein will obviously occur to those skilled in the art upon becoming familiar with said underlying concept.

We claim:

1. An asset management system for collecting user voting selections prior to transmitting the user voting selections to a central securities depository, the asset management system comprising:
   at least one processor;
   at least one data store including preference profiles and logs for user accounts of the asset management system;
   the at least one processor configured to determine one or more recommended proxy user accounts from the one or more user accounts of the asset management system for receiving proxy voting rights to be delegated by a first user account, wherein the one or more recommended proxy user accounts are determined by correlating a first voting preference or first user activity stored in a first preference profile and a first log associated with the first user account with a second voting preference or second user activity stored in second preference profiles and second logs associated with the one or more recommended proxy user accounts;
   a user device configured to present a graphical user interface including an option to select a recipient user account from the one or more recommended proxy user accounts to receive the proxy voting rights delegated by the first user account, and to receive a selection of the recipient user account in the graphical user interface,
   wherein the at least one processor is further configured to provide a shareholder voting instruction to enable proxy voting by the recipient user account on behalf of the first user account.

2. The asset management system of claim 1, wherein the first preference profile associated with the first user account includes voting instructions that specify how the asset management system should determine the one or more recommended proxy user accounts.

3. The asset management system of claim 1, wherein the first preference profile associated with the first user account includes voting instructions that specify how the one or more recommended proxy user accounts should vote on a type of issue when it is on a ballet.

4. The asset management system of claim 1, wherein the first preference profile associated with the first user account includes proxy instructions that indicate that if a proxy vote does not match the first preference profile that the proxy vote should not be submitted.

5. The asset management system of claim 1, wherein the determination of the one or more recommended proxy user accounts from the one or more user accounts is performed by the asset management system that is configured to:
   generate a probability map indicating a degree of correlation of second account activity data of the one or more user accounts to first account activity data of the first user account; and
   determine the one or more recommended proxy user accounts from the probability map.

6. The asset management system of claim 1, wherein the asset management system is configured to:
   store in a data store for proxy designations, an indication of the selection of the recipient user account to vote on behalf of the first user account.

7. The asset management system of claim 1, wherein the asset management system is configured to:
   receive the shareholder voting instruction from the central securities depository;

receive, from the user device of the recipient user account to vote on behalf of the first user account, a proxy vote for submitting on behalf of the first user account; and submit the proxy vote to the central securities depository.

8. The asset management system of claim 1, wherein the asset management system is further configured to:

identify a set of fractional user votes from one or more votes from the one or more user accounts of the asset management system, each fractional user vote is worth less than one complete voting share;

extract, from the set of fractional user votes, a subset of fractional user votes indicative of a particular voting selection; and collect a first aggregate of the fractional user votes indicative of a first selection, the first aggregate of the fractional user votes equal to one or more complete voting shares for submitting as the subset of fractional user votes.

9. A computer-implemented method, comprising:

determining, by an asset management system, one or more recommended proxy user accounts for receiving proxy voting rights to be delegated by a first user account, wherein the one or more recommended proxy user accounts are determined by correlating a first voting preference or first user activity stored in a first preference profile and a first log associated with the first user account with a second voting preference or second user activity stored in second preference profiles and second logs associated with the one or more recommended proxy user accounts;

transmitting, by the asset management system to a user device associated with the first user account, a request to select a recipient user of the one or more recommended proxy user accounts by the first user account, wherein the request for selection causes the user device associated with the first user account to display a graphical user interface including an option to select a recipient user account from the one or more recommended proxy user accounts; and receiving the recipient user account selected within the graphical user interface as the selected proxy user account to receive the proxy voting rights delegated by the first user account, providing, by the asset management system the second user account, the proxy voting rights to enable proxy voting by the recipient user account on behalf of the first user account.

10. The computer-implemented method of claim 9, wherein the first preference profile associated with the first user account includes voting instructions that specify how the asset management system should determine the one or more recommended proxy user accounts.

11. The computer-implemented method of claim 9, wherein the first preference profile associated with the first user account includes voting instructions that specify how the one or more recommended proxy user accounts should vote on a type of issue when it is on a ballot.

12. The computer-implemented method of claim 9, wherein the first preference profile associated with the first user account includes proxy instructions that indicate that if a proxy vote does not match the first preference profile that the proxy vote should not be submitted.

13. The computer-implemented method of claim 9, wherein the determination of the one or more recommended proxy user accounts further comprises:

generating a probability map indicating a degree of correlation of second account activity data of the one or more recommended proxy user accounts to first account activity data of the first user account; and determining the one or more recommended proxy user accounts from the probability map.

14. The computer-implemented method of claim 9, further comprising:

storing in a data store for proxy designations, an indication of the selection of the recipient user account to vote on behalf of the first user account.

15. The computer-implemented method of claim 9, further comprising:

receiving a shareholder voting instruction from a central securities depository;

receiving, from the user device of the recipient user account to vote on behalf of the first user account, a proxy vote for submitting on behalf of the first user account; and submit the proxy vote to the central securities depository.

16. The computer-implemented method of claim 9, further comprising:

identifying a set of fractional user votes from one or more votes from one or more user accounts of the asset management system, each fractional user vote is worth less than one complete voting share;

extracting, from the set of fractional user votes, a subset of fractional user votes indicative of a particular voting selection; and collecting a first aggregate of the fractional user votes indicative of a first selection, the first aggregate of the fractional user votes equal to one or more complete voting shares for submitting as the subset of fractional user votes.

17. A non-transitory computer-readable medium comprising instructions stored thereon, the instructions being effective to cause at least one processor to:

determine one or more recommended proxy user accounts for receiving proxy voting rights to be delegated by a first user account, wherein the one or more recommended proxy user accounts are determined by correlating a first voting preference or first user activity stored in a first preference profile and a first log associated with the first user account with a second voting preference or second user activity stored in second preference profiles and second logs associated with the one or more recommended proxy user accounts;

transmit to a user device associated with the first user account, a request to select a recipient user of the one or more recommended proxy user accounts by the first user account, wherein the request for selection causes the user device associated with the first user account to display a graphical user interface including an option to select a recipient user account from the one or more recommended proxy user accounts; and receive the recipient user account selected within the graphical user interface as the selected proxy user account to receive the proxy voting rights delegated by the first user account, provide the second user account with the proxy voting rights to enable proxy voting by the recipient user account on behalf of the first user account.

18. The non-transitory computer-readable medium of claim 17, wherein the first preference profile associated with the first user account includes voting instructions that specify how an asset management system should determine the one or more recommended proxy user accounts.

19. The non-transitory computer-readable medium of claim 17, wherein the first preference profile associated with the first user account includes voting instructions that specify how the one or more recommended proxy user accounts should vote on a type of issue when it is on a ballot.

20. The non-transitory computer-readable medium of claim 17, wherein the first preference profile associated with the first user account includes proxy instructions that indicate that if a proxy vote does not match the first preference profile that the proxy vote should not be submitted.

* * * * *